(12) United States Patent
Shiga et al.

(10) Patent No.: US 9,132,868 B2
(45) Date of Patent: Sep. 15, 2015

(54) SPOILER DEVICE FOR VEHICLE

(71) Applicant: AISIN SEIKI KABUSHIKI KAISHA, Kariya-shi, Aichi-ken (JP)

(72) Inventors: Tokuhiro Shiga, Anjo (JP); Kenji Hori, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/494,997

(22) Filed: Sep. 24, 2014

(65) Prior Publication Data

US 2015/0091325 A1  Apr. 2, 2015

(51) Int. Cl.
 *B62D 35/00* (2006.01)
(52) U.S. Cl.
 CPC .................................. *B62D 35/007* (2013.01)
(58) Field of Classification Search
 CPC .... B62D 35/00; B62D 35/007; B62D 35/005; B62D 35/008
 USPC ........................................... 296/180.1, 180.5
 See application file for complete search history.

(56) References Cited

U.S. PATENT DOCUMENTS 4,889,382 A * 12/1989 Burst et al. .................. 296/180.5
5,120,105 A * 6/1992 Brin et al. ................... 296/180.5
5,141,281 A * 8/1992 Eger et al. ................... 296/180.5
2004/0256885 A1* 12/2004 Bui ............................. 296/180.5
2011/0285168 A1* 11/2011 Roemer et al. ............. 296/180.5
2013/0257092 A1* 10/2013 Neumann et al. .......... 296/180.5
2014/0021742 A1* 1/2014 Durm et al. ................. 296/180.5
2014/0346810 A1* 11/2014 Wild et al. .................. 296/180.5
2015/0091325 A1* 4/2015 Shiga et al. ................. 296/180.1

FOREIGN PATENT DOCUMENTS

JP  11-34936  2/1999
JP  2008-168843  7/2008

* cited by examiner

*Primary Examiner* — Gregory Blankenship
(74) *Attorney, Agent, or Firm* — Finnegan, Henderson, Farabow, Garrett & Dunner, LLP (57) ABSTRACT

A spoiler device for a vehicle includes plural link mechanisms configured to support a spoiler via plural rotatable link members in a deployed state where the spoiler protrudes from a surface of the vehicle, a driving shaft configured to connect each of the link members provided to be spaced apart from each other in a vehicle width direction, the driving shaft configured to change the deployed state and a retracted state of the spoiler by rotating each of the link members about an axis of the driving shaft, and a connection mechanism connecting an input shaft to which a driving torque of a power source is inputted and the driving shaft to transmit the torque therebetween.

12 Claims, 8 Drawing Sheets

SPOILER DEVICE FOR VEHICLE

CROSS REFERENCE TO RELATED APPLICATIONS

This application is based on and claims priority under 35 U.S.C. §119 to Japanese Patent Application 2013-205039, filed on Sep. 30, 2013, the entire content of which is incorporated herein by reference.

TECHNICAL FIELD

This disclosure generally relates to a spoiler device for a vehicle.

BACKGROUND DISCUSSION

A known movable spoiler device for a vehicle which changes a deployment and a retraction of a spoiler mounted to the vehicle is disclosed in JP2008-168843A (hereinafter, referred to as Patent reference 1). According to Patent reference 1, for example, a rear spoiler device is provided at a rear of the vehicle. According to the spoiler device disclosed in Patent reference 1, the spoiler, or a wing portion is supported above a trunk lid by a right-left pair of columnar support shafts. The spoiler device disclosed in Patent reference 1 includes an actuator which uses a motor as a power source for deploying and retracting the spoiler. The spoiler device deploys and retracts the spoiler integrally with the support shafts while supporting opposing ends of the spoiler in a width direction by the support shafts.

However, according to the aforementioned known configuration, the vehicle needs to secure a large space for housing the support shafts. In addition, the spoiler device disclosed in Patent reference 1 deploying and retracting the spoiler integrally with the support shafts does not enhance operation efficiency.

A need thus exists for a spoiler device for a vehicle which is not susceptible to the drawback mentioned above.

SUMMARY

According to an aspect of this disclosure, a spoiler device for a vehicle includes plural link mechanisms configured to support a spoiler via plural rotatable link members in a deployed state where the spoiler protrudes from a surface of the vehicle, a driving shaft configured to connect each of the link members provided to be spaced apart from each other in a vehicle width direction, the driving shaft configured to change the deployed state and a retracted state of the spoiler by rotating each of the link members about an axis of the driving shaft, and a connection mechanism connecting an input shaft to which a driving torque of a power source is inputted and the driving shaft to transmit the torque therebetween. The connection mechanism includes a nut member being mounted to a screw portion formed on the input shaft, the nut member thereby moving in an axial direction in response to a rotation of the input shaft, and a connection member including a connection portion moving in a circumferential direction about the axis of the driving shaft in response to a movement of the nut member in the axial direction, the connection member integrally rotating with the driving shaft.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
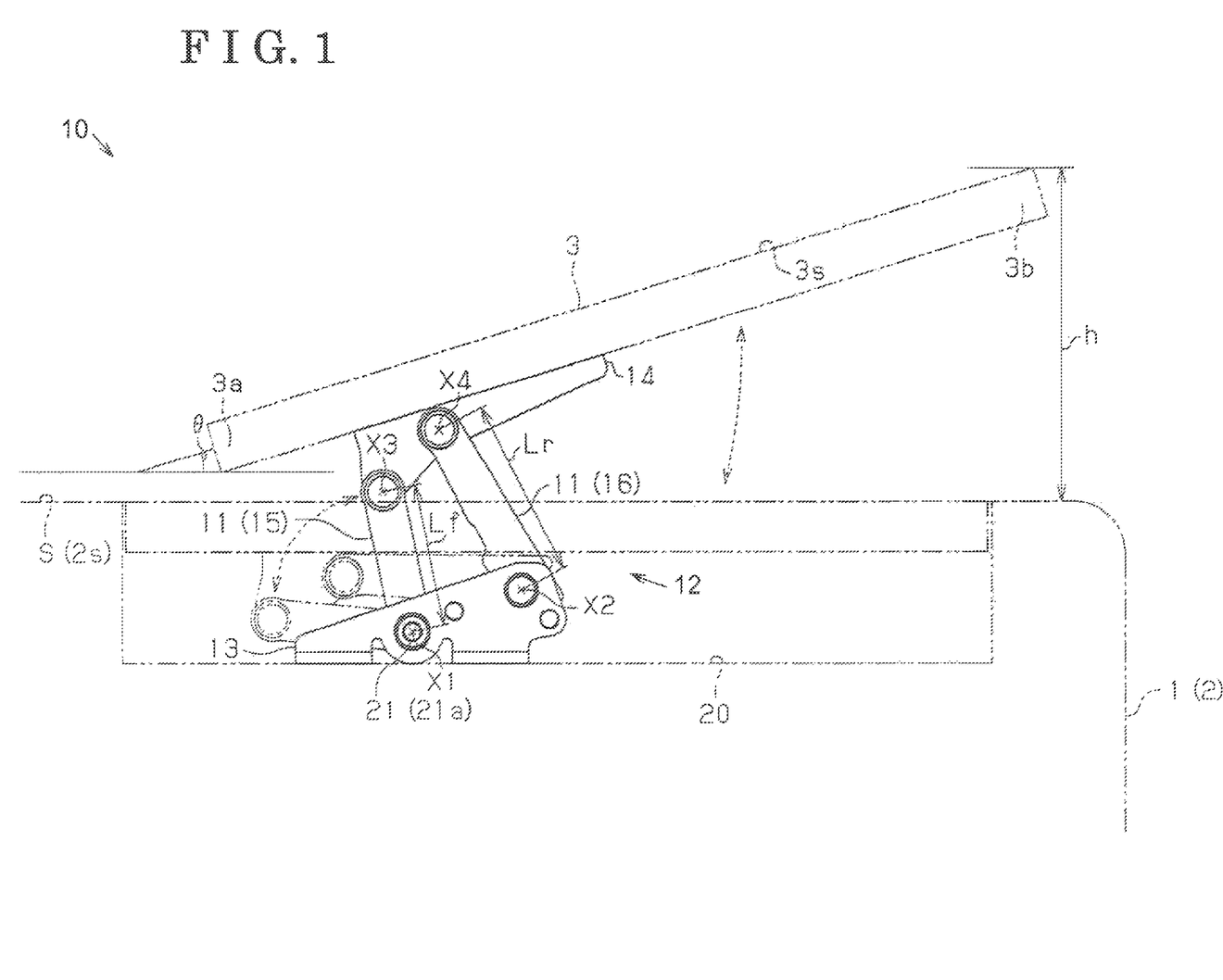
FIG. 1 is a side view of a schematic construction of a spoiler device according to first and second embodiments disclosed here.
Figure 2:
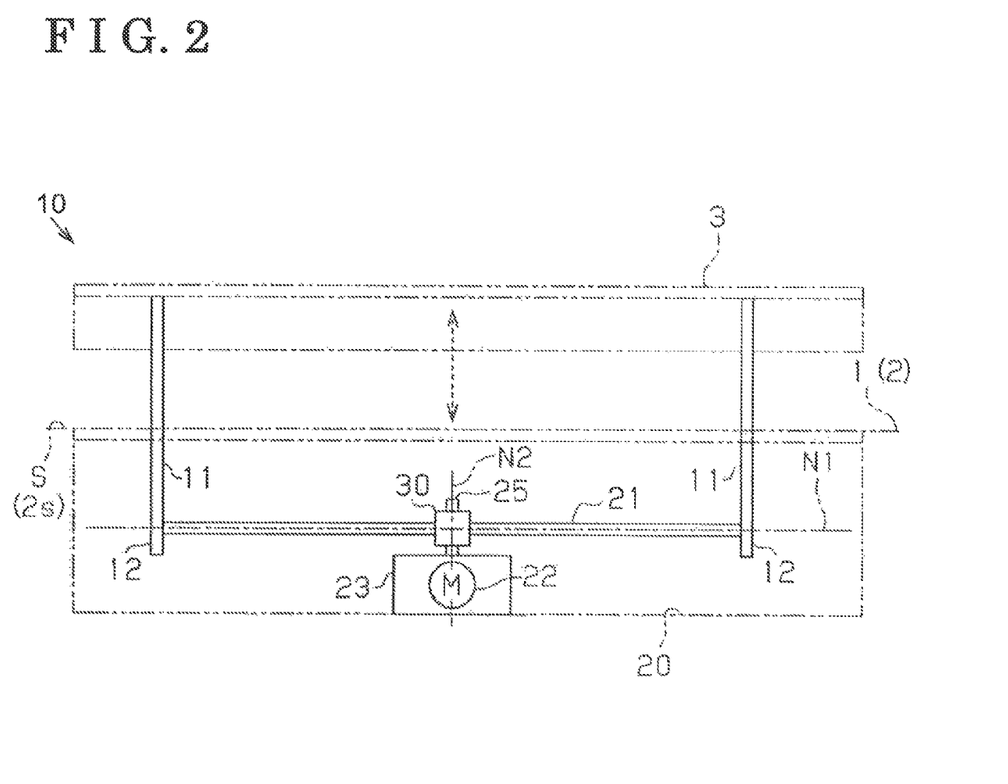
FIG. 2 is a back view of a schematic construction of the spoiler device according to the first and second embodiments.

A first embodiment of a spoiler device 10 for a vehicle will be explained hereunder referring to the drawings. As shown in FIGS. 1 and 2, a trunk lid 2 which is provided at a rear of a vehicle 1 includes a spoiler 3. The spoiler 3 is supported above the trunk lid 2 in a deployed state, or an extended state where the spoiler 3 protrudes from an outer surface 2S (a vehicle surface S). The vehicle 1 of the embodiment includes the spoiler device 10 which changes aerodynamic characteristics of the vehicle 1 by changing a deployment, or an extension and retraction of the spoiler 3.

Specifically, the spoiler 3 of the first embodiment includes a wing-shaped appearance and extends in a vehicle width direction, or, in the right-left direction in FIG. 2. Plural link mechanisms 12 are mounted on the trunk lid 2 to support the spoiler 3 upward via link members 11. In particular, the trunk lid 2 of the first embodiment includes the right-left pair of link mechanisms 12 positioned to be spaced apart from each other in the vehicle width direction. The spoiler device 10 of the first embodiment changes the deployment, or the extension and retraction of the spoiler 3 by actuating the link mechanisms 12.

Figure 3:
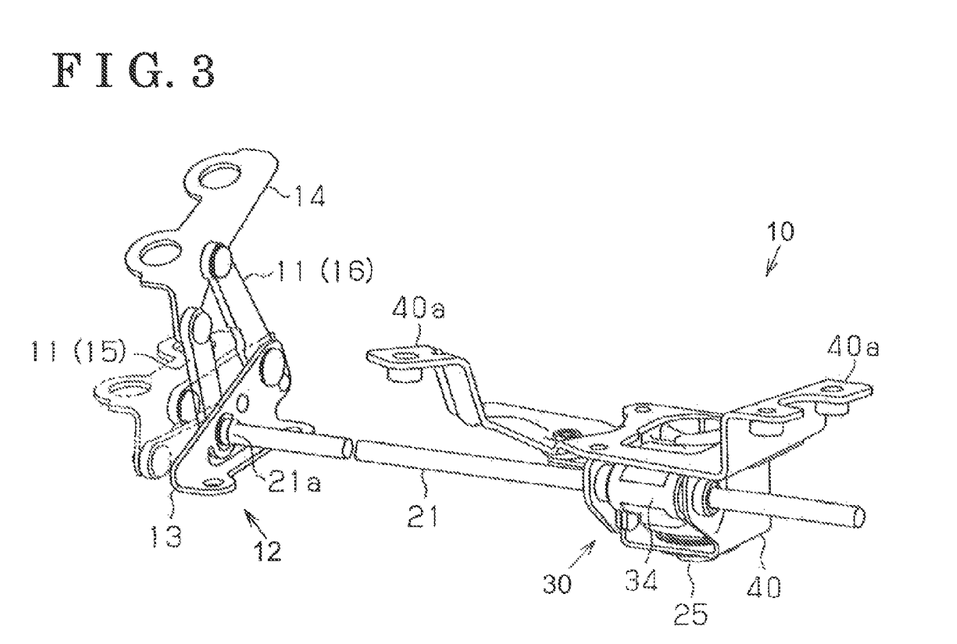
FIG. 3 is a perspective view partially illustrating the spoiler device according to the first embodiment.

Further in detail, as shown in FIGS. 1 and 3, each of the link mechanisms 12 includes a lower bracket 13 which is fixed to the trunk lid 2 and an upper bracket 14 which is fixed to the spoiler 3. The link mechanism 12 of the first embodiment includes a known structure where the lower bracket 13 and the upper bracket 14 are connected by two link members 11, that are, a front link 15 and a rear link 16.

Specifically, according to the link mechanisms 12 of the first embodiment, the front link 15 and the rear link 16 include a first connection point X1 of the front link 15 for the lower bracket 13, a second connection point X2 of the rear link 16 for the lower bracket 13, a third connection point X3 of the front link 15 for the upper bracket 14, and a fourth connection point X4 of the rear link 16 for the upper bracket 14. The link mechanisms 12 are arranged such that the third connection point X3 of the front link 15 for the upper bracket 14 and the fourth connection point X4 of the rear link 16 for the upper bracket 14 are positioned closer to a front of the vehicle 1 (the left in FIG. 1) than the first connection point X1 of the front link 15 for the lower bracket 13 and the second connection point X2 of the rear link 16 for the lower bracket 13, respectively.

That is, according to the link mechanisms 12 of the first embodiment, by rotating the link members 11 in the clockwise direction in FIG. 1 so as to move the third and fourth connection points X3, X4 for the upper bracket 14 toward the rear of the vehicle 1, the spoiler 3 fixed to the upper bracket 14 moves upward. By rotating the link members 11 in the anticlockwise direction in FIG. 1 so as to move the third and fourth connection points X3, X4 toward the front of the vehicle 1, the spoiler 3 fixed to the upper bracket 14 moves downward.

According to the first embodiment, a link length Lf of the front link 15, that, a length from the first connection point X1 to the third connection point X3, is set to be longer than a link length Lr of the rear link 16, that is, a length from the second connection point X2 to the fourth connection point X4. Thus, according to the link mechanisms 12 of the first embodiment, a rear end portion 3b of the spoiler 3 is lifted higher than a front end portion 3a of the spoiler 3 in a state where the spoiler 3 which is supported by the link mechanisms 12 moves upward to establish the deployed state, or the extended state.

As shown in FIGS. 1 and 2, according to the first embodiment, the trunk lid 2 includes a housing recessed portion 20 which opens at the outer surface 2s. Each of the link mechanisms 12 is fixed within the housing recessed portion 20.

The housing recessed portion 20 includes a rectangular opening shape which is substantially similar to a shape of an upper surface 3s of the spoiler 3. According to the first embodiment, the spoiler 3 moves downward to be housed within the housing recessed portion 20.

According to the first embodiment, the spoiler 3 is housed within the housing recessed portion 20 in a manner that closes the opening portion thereof. In the housed state, the upper surface 3s of the spoiler 3 is substantially flush with the outer surface 2s of the trunk lid 2, that is, the vehicle surface S.

The spoiler device 10 of the first embodiment includes a driving shaft 21 which connects the link members 11 of the link mechanisms 12 which are spaced apart from each other in the vehicle width direction. According to the first embodiment, the driving shaft 21 extends in the vehicle width direction within the housing recessed portion 20, and each of opposing axial end portions 21a of the driving shaft 21 is connected to a base end portion of the front link 15 of the link mechanism 12.

Specifically, as shown in FIGS. 1 and 3, each of the axial end portions 21a of the driving shaft 21 is relatively unrotatably fixed to the front link 15 of the link mechanism 12 at a position where the axial end portion 21a is coaxial with the first connection point X1 for the lower bracket 13. That is, the driving shaft 21 of the first embodiment integrally rotates with each of the front links 15 about a first axis N1 which passes through the first connection point X1 for the lower bracket 13. Accordingly, in the first embodiment, the deployment, or the extension and retraction of the spoiler 3 supported by the link mechanisms 12 may be changed.

As shown in FIG. 2, in the first embodiment, the housing recessed portion 20 houses an actuator 23 which uses a motor 22 as a power source and an input shaft 25 to which the drive torque is inputted. The spoiler device 10 of the first embodiment includes a connection mechanism 30 which connects the input shaft 25 and the driving shaft 21 so as to transmit the torque therebetween.

As shown in FIGS. 2 and 4 to 6, according to the spoiler device 10 of the first embodiment, the input shaft 25 is positioned within the housing recessed portion 20 so as to establish a skew positional relationship relative to the driving shaft 21 which extends in the vehicle width direction, that is, the input shaft 25 is postured as such that a second axis N2 of the input shaft 25 intersects with, or is substantially orthogonal to, the first axis N1 of the driving shaft 21. According to the first embodiment, the input shaft 25 includes a screw portion 31 whose outer circumferential surface is threaded with screw threads. In addition, the connection mechanism 30 of the first embodiment is provided with a nut member 32 and a connection member 34. The nut member 32 is screwed and fixed to the screw portion 31. The connection member 34 includes a connection portion 33 which moves in a circumferential direction about the first axis N1 of the driving shaft 21 in response to, or on the basis of the movement of the nut member 32 in the axial direction and integrally rotates with the driving shaft 21.

Figure 4:
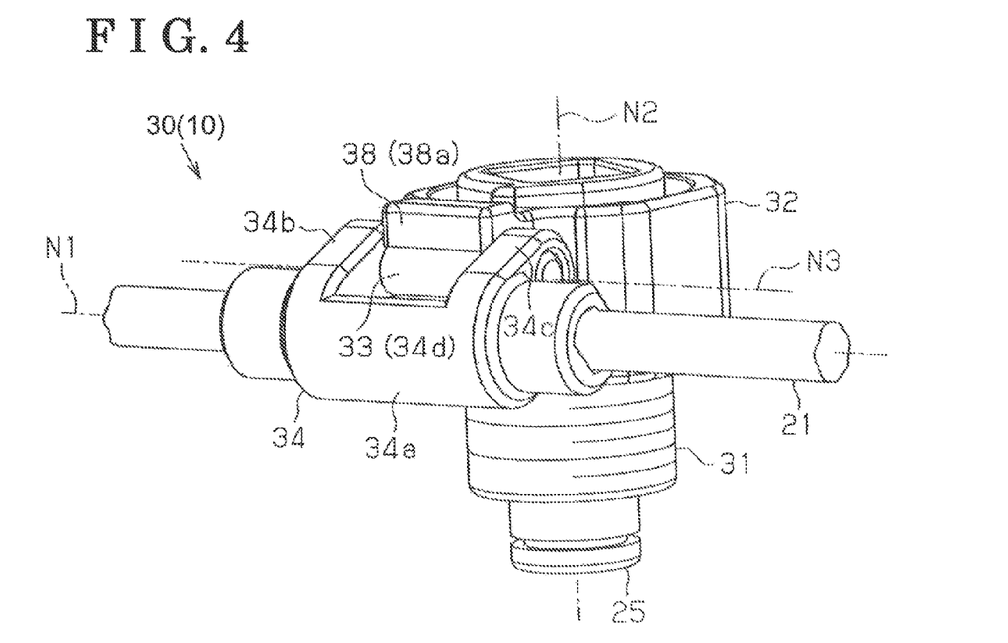
FIG. 4 is a perspective view of a connection mechanism according to the first embodiment.

Specifically, the connection member 34 of the first embodiment includes a base portion 34a which is relatively unrotatably fixed to the driving shaft 21. The base portion 34a of the first embodiment includes a cross sectional shape which is formed in a substantially sector-shape (see FIGS. 5 and 6). As shown in FIG. 4, the base portion 34a is provided with a first support portion 34b and a second support portion 34c which serve as a pair and extend radially outward to be parallel to one another at two positions being spaced apart from each other in the direction of the first axis N1 of the driving shaft 21. Further, a shaft-shaped portion 34d extends over the first and second support portions 34b, 34c in a direction of a third axis N3 which is along the driving shaft 21, specifically, the direction substantially parallel to the driving shaft 21. The connection member 34 of the first embodiment includes the shaft-shaped portion 34d which serves as the connection portion 33 and connects to the nut member 32.

Figure 5:
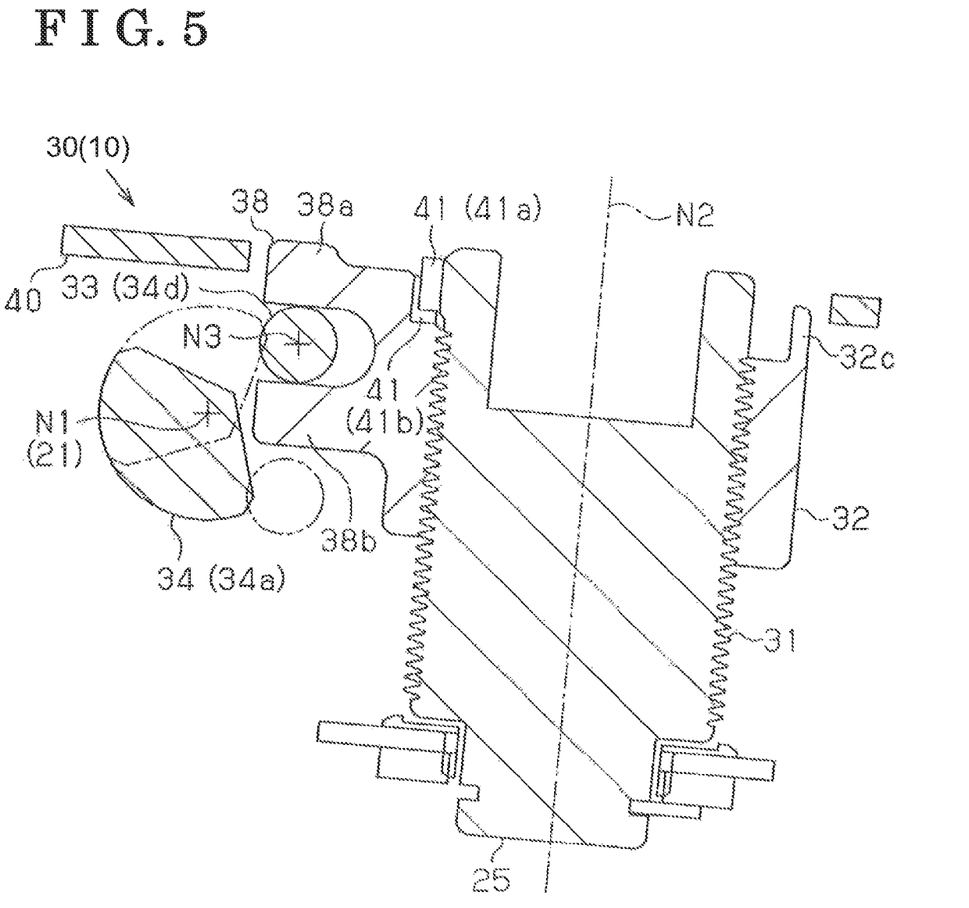
FIG. 5 is a cross-sectional view of the connection mechanism when a nut member is positioned at an upper portion of an input shaft according to the first embodiment.

As shown in FIG. 5, the nut member 32 of the first embodiment includes an engagement portion 38 which engages with the shaft-shaped portion 34d of the connection member 34. Specifically, the engagement portion 38 includes a first wall portion 38a and a second wall portion 38b which are positioned to face with each other in a direction of the second axis N2 of the input shaft 25 to which the nut member 32 is screwed and fixed. The shaft-shaped portion 34d of the connection member 34 is interposed between the first wall portion 38a and the second wall portion 38b and engages with the engagement portion 38.

That is, according to the connection mechanism 30 of the first embodiment, by the first and second wall portions 38a, 38b configuring the engagement portion 38 of the nut member 32, the shaft-shaped portion 34d configuring the connection portion 33 of the connection member 34 is prevented from relatively displacing to the input shaft 25 to which the nut member 32 is screwed and fixed in the direction of the second axis N2. The connection portion 33 of the connecting member 34 relatively displaces to the nut member 32 in the radial direction. According to the first embodiment, the connection portion 33 of the connection member 34 which engages with the engagement portion 38 moves in the circumferential direction about the first axis N1 of the driving shaft 21 in response to the movement of the nut member 32 in the axial direction.

Figure 6:
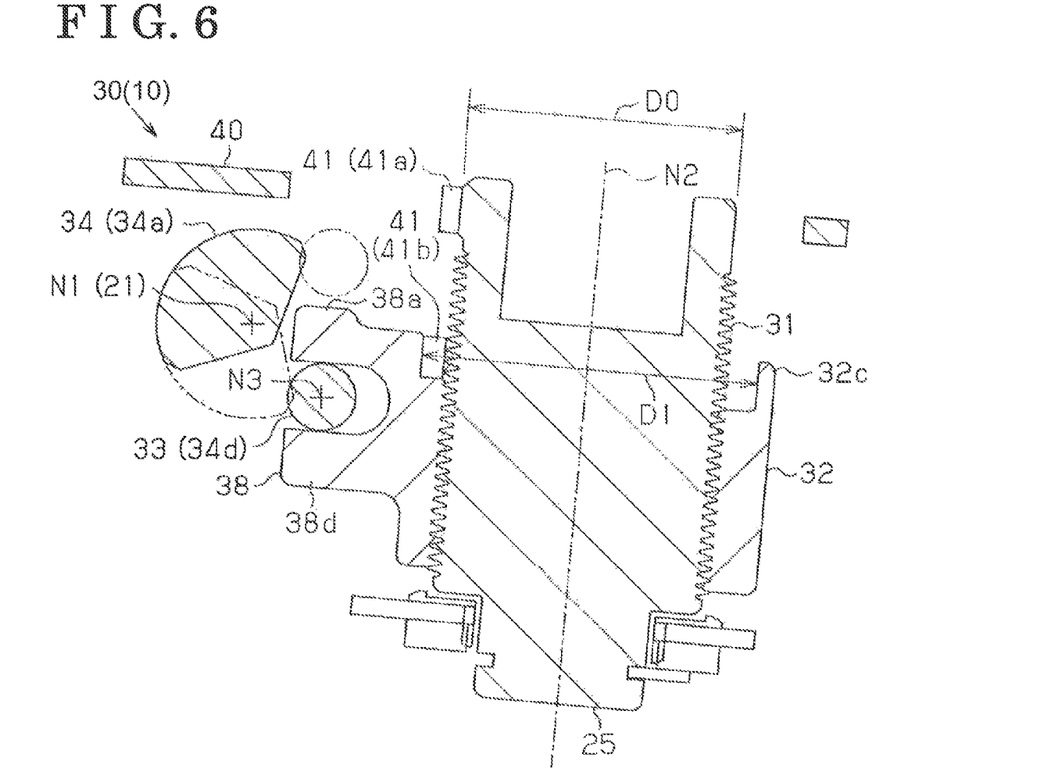
FIG. 6 is a cross-sectional view of the connection mechanism when the nut member is positioned at a lower portion of the input shaft according to the first embodiment.

That is, as shown in FIGS. 5 and 6, in response to a threading relation (screw pair) of the nut member 32 and the input shaft 25, the nut member 32 which is screwed and fixed to the input shaft 25 moves in the axial direction in response to the rotation of the input shaft 25. In those circumstances, the connection portion 33 of the connection member 34 which engages with the engagement portion 38 of the nut member 32 changes the relative position to the nut member 32 in the radial direction while moving integrally with the nut member 32 in the axial direction. Thus, according to the connection mechanism 30 of the first embodiment, the connection member 34 integrally rotates with the driving shaft 21 because a force which moves the connection portion 33 in a circumferential direction about the first axis N1 of the driving shaft 21, that is, which rotates the connection member 34 is generated.

As shown in FIG. 3, according to the first embodiment, the nut member 32 and the connection member 34 configuring the connection mechanism 30 are held within a support bracket 40 which includes flange-shaped joining portions 40a. By fixing the support bracket 40 to the trunk lid 2, the positioning of the support bracket 40 is defined within the housing recessed portion 20.

As shown in FIG. 6, the input shaft 25 of the first embodiment includes a first protrusion 41a which protrudes radially outward at a position closer to the screw portion 31 in the axial direction. An annular portion 32c is positioned at an end portion of the nut member 32 in the axial direction and includes an inner diameter D1 which is larger than a diameter D0 of the input shaft 25. A second protrusion 41b is positioned at an inner circumferential surface of the annular portion 32c and protrudes radially inward.

As shown in FIG. 5, according to the first embodiment, when the nut member 32 moves in the axial direction in response to the rotation of the input shaft 25, the first protrusion 41a of the input shaft 25 comes in contact with the second protrusion 41b of the nut member 32 in the circumferential direction. Specifically, in a case where the nut member 32 moves in the axial direction up to an upper end portion of the screw portion 31 as shown in FIG. 5, the first protrusion 41a comes in contact with the second protrusion 41b. Serving as stopper portions 41, the first protrusion 41a and the second protrusion 41b restrict the input shaft 25 and the nut member 32 from relatively rotating with each other.

Next, the operation of the spoiler device 10 of the first embodiment configured as above will be explained. According to the spoiler device 10 of the first embodiment, the drive torque of (the motor 22 of) the actuator 23 inputted to the input shaft 25 is transmitted to the driving shaft 21 via the connection mechanism 30. Accordingly, because each of the front links 15 of the link mechanisms 12 integrally rotates with the driving shaft 21, the spoiler 3 supported by the link mechanisms 12 is changed to be deployed or retracted.

Specifically, as shown in FIG. 1, when the driving shaft 21 rotates in the clockwise direction, a protrusion amount h of the spoiler 3 which protrude upward from the outer surface 2s of the trunk lid 2 configuring the vehicle surface S is increased. Along with that, an inclined angle, or tilt angle θ of the spoiler 3 which is generated by lifting the rear end portion 3b is increased. As shown in FIG. 1, the protrusion amount h and the inclined angle θ of the spoiler 3 are decreased by rotating the driving shaft 21 in the anti-clockwise direction. According to the spoiler device 10 of the embodiment, the spoiler 3 moves downward to be housed within the housing recessed portion 20 which is formed at the trunk lid 2. Accordingly, the upper surface 3s of the spoiler 3 comes to be substantially flush with the vehicle surface S.

According to the first embodiment, the following advantages and effects are obtained. The spoiler device 10 includes the plural link mechanisms 12 which support the spoiler 3 in the extended state where the spoiler 3 protrudes from the vehicle surface S via the link member 11 (the front link 15). The spoiler device 10 includes the driving shaft 21 which connects each of the link members 11 of the link mechanisms 12 provided to be spaced apart from each other in the vehicle width direction. The driving shaft 21 changes the deployment, or the extension and retraction of the spoiler 3 which is supported by the link mechanisms 12 by rotating each of the link members 11 about the first axis N1 of the driving shaft 21. The spoiler device 10 includes the connection mechanism 30 which connects the input shaft 25 to which the driving torque as a power source is inputted and the driving shaft 21 to transmit the torque therebetween. The connection mechanism 30 includes the nut member 32 and the connecting member 34. The nut member 32 is screwed and fixed to the screw portion 31 which is formed at the input shaft 25 and moves in the axial direction in response to the rotation of the input shaft 25. The connecting member 34 includes the connection portion 33 which moves in the circumferential direction about the first axis N1 of the driving shaft 21 in response to the movement of the nut member 32 in the axial direction and integrally rotates with the driving shaft 21.

That is, because the link mechanism 12 changes the deployment, or the extension and retraction of the spoiler 3 by the rotation of the link member 11, a housing space, that is, the housing recessed portion 20 required to mount the spoiler device 10 to the vehicle 1, or to the trunk lid 2 may be reduced. In addition, the driving shaft 21 connects each of the link members 11, or the front links 15 of the link mechanisms 12 provided to be spaced apart from each other in the vehicle width direction and rotates the link members 11 about the first axis N1 of the driving shaft 21 so that each of the link mechanisms 12 synchronously moves with each other precisely with a simple configuration. Further, the connection mechanism 30 includes the nut member 32 and the connection member 34. The nut member 32 is screwed and fixed to the screw portion 31 of the input shaft 25. The connection member 34 includes the connection portion 33 which moves in the circumferential direction about the first axis N1 of the driving shaft 21 in response to the movement of the nut member 32 in the axial direction and integrally rotates with the driving shaft 21. Thus, the driving torque inputted to the input shaft 25 may be transmitted to the driving shaft 21 efficiently with a small and simple configuration.

That is, when the nut member 32 moves in the axial direction in response to the threading relation (screw pair) with the input shaft 25 and the connection portion 33 connected to the nut member 32 moves in the circumferential direction about the first axis N1 of the driving shaft 21, the rotation force which rotates the driving shaft 21 about the first axis N1 is applied to the connection member 34.

Because the input shaft 25 is positioned to intersect with the driving shaft 21 (including the skew position relative to the driving shaft 21), the actuator 23 (the motor 22) serving as a power source may be flexibly positioned. Accordingly, the spoiler device 10 may be downsized. According to the aforementioned configuration, the space efficiency and the operation efficiency may be enhanced.

The nut member 32 includes the engagement portion 38 which engages with the connection portion 33 of the connection member 34 in a state where the connection portion 33 of the connection member 34 relatively displaces with the nut member 32 in the radial direction while restricting a relative displacement with the input shaft 25 in the direction of the second axis N2.

According to the aforementioned configuration, the connection portion 33 of the connection member 34 moves in the circumferential direction about the first axis N1 of the driving shaft 21 smoothly in response to the movement of the nut member 32 in the axial direction. Accordingly, the rotation force that rotates the driving shaft 21 about the first axis N1 may be applied to the connection member 34 efficiently. As a result, the driving torque being inputted to the input shaft 25 may be transmitted to the driving shaft 21 efficiently.

The connection portion 33 of the connection member 34 is configured with the shaft-shaped portion 34d which extends in the direction along the driving shaft 21, in particular, the direction substantially parallel to the driving shaft 21. The engagement portion 38 of the nut member 32 includes the first and second wall portions 38a, 38b which are positioned to interpose the shaft-shaped portion 34d therebetween in the direction of the second axis N2 of the input shaft 25.

According to the aforementioned embodiment, the connection portion 33 of the connection member 34 and the nut member 32 engage with one another in a state where the connection portion 33 of the connection member 34 relatively displaces with the nut member 32 in the radial direction while restricting the relative displacement with the input shaft 25 in the direction of the second axis N2 with the simple configuration. In addition, the mounting process may be efficiently operated.

The input shaft 25 and the nut member 32 include the first protrusion 41a and the second protrusion 41b, respectively, which come in contact with each other when the nut member 32 moves in the axial direction in response to the rotation of the input shaft 25. Serving as the stopper portions 41, the first and second protrusions 41a, 41b restrict the input shaft 25 and the nut member 32 from relatively rotating with each other.

According to the aforementioned configuration, the excessive rotation of the input shaft 25 in response to the driving torque of the power source is prevented, whereas the excessive movement of the link mechanisms 12 to which the rotation is transmitted is prevented. Thus, because the load is reduced, the reliability is enhanced.

A second embodiment of a spoiler device 10B for the vehicle will be explained hereunder referring to the drawings. In comparison with the spoiler device 10 of the aforementioned first embodiment, the spoiler device 10B of the second embodiment includes a different configuration of a connecting mechanism 30B. For convenience of description, the same components as those described in the first embodiment are marked with the same reference numerals, and description of the components will not be repeated.

Figure 7:
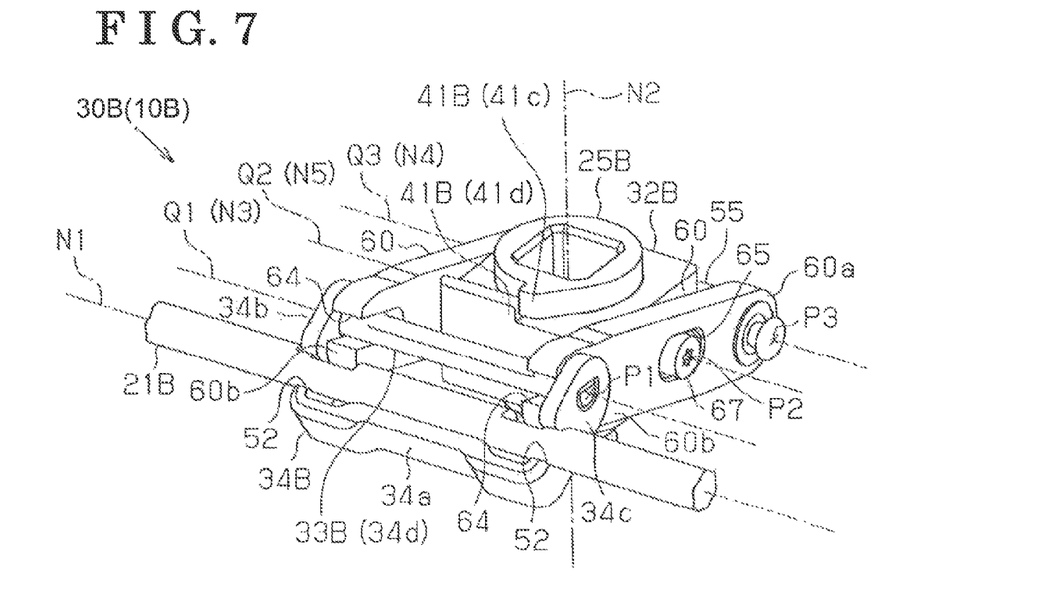
FIG. 7 is a perspective view of a connection mechanism when a nut member is positioned at an upper portion of an input shaft according to a second embodiment.
Figure 8:
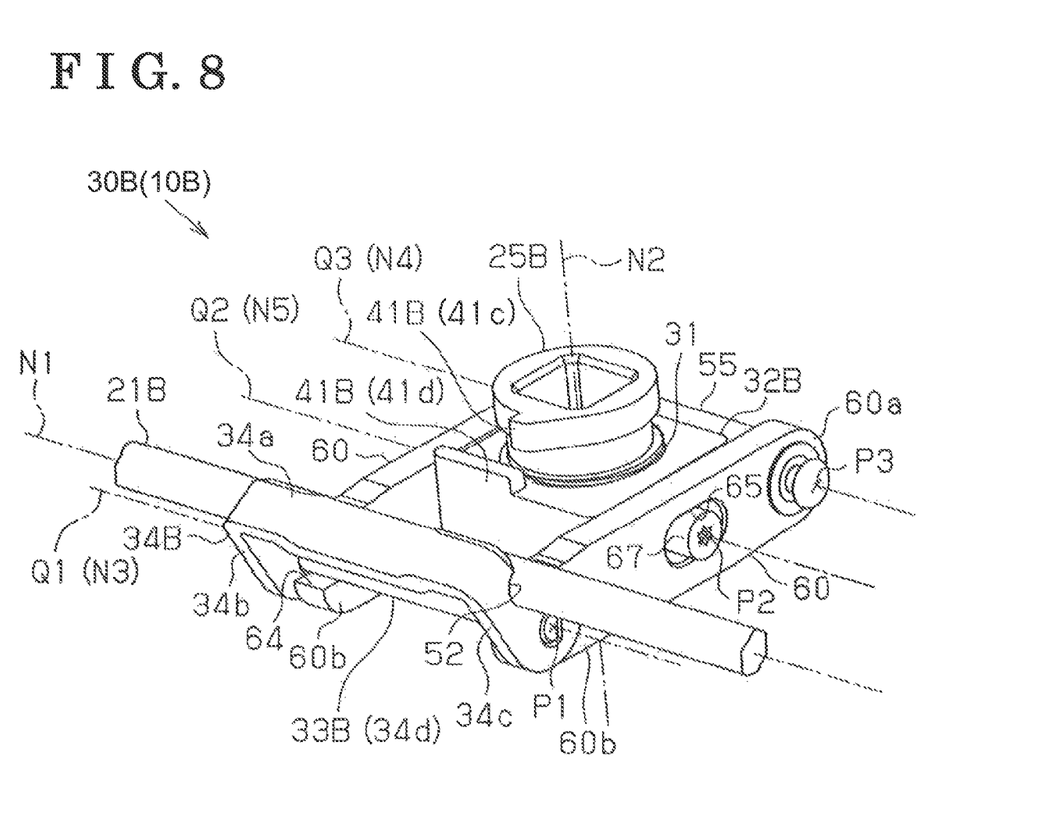
FIG. 8 is a perspective view of the connection mechanism when the nut member is positioned at a lower portion of the input shaft according to the second embodiment.

As shown in FIGS. 7 and 8, similar to the connection member 34 of the aforementioned first embodiment, the connection mechanism 30B of the second embodiment includes a connection member 34B which is provided with the base portion 34a, the pair of support portions 34b, 34c (the first support portion 34b, the second support portion 34c) and the shaft-shaped portion 34d. The base portion 34a is fixed to a driving shaft 21B. The pair of first and second support portions 34b, 34c extends radially outward from the base portion 34a. The shaft-shaped portion 34d is supported by the first and second support portions 34b, 34c.

Specifically, according to the connection member 34B of the second embodiment, the base portion 34a and the first and second support portions 34b, 34c are integrally formed by deformation processing (folding process) of a metal plate. Opposing ends of the shaft-shaped portion 34d are extended over each end of the first and second support portions 34b, 34c to be supported by the first and second support portions 34b, 34c. According to the second embodiment, the connection member 34B is connected to a nut member 32B via the shaft-shaped portion 34d which serves as a connection portion 33B.

In particular, each base end of the first and second support portions 34b, 34c includes a fitting portion 52 which fits the driving shaft 21B. According to the connection member 34B of the second embodiment, by fitting the driving shaft 21B to the fitting portions 52, the shaft-shaped portion 34d configuring the connection portion 33B is positioned along the direction of the first axis N1 of the driving shaft 21B, in particular, the direction substantially parallel to the driving shaft 21B. The connection member 34B is welded to the driving shaft 21B at each of the fitting portions 52 and the base portion 34a so that the driving shaft 21B is relatively unrotatably fixed to the connection member 34B.

As shown in FIGS. 7 to 10, the connection mechanism 30B of the second embodiment includes a shaft member 55 serving as a fixed portion which does not change the relative position to the driving shaft 21B within the housing recessed portion 20. According to the second embodiment, the shaft member 55 is placed at a position where the shaft member 55 and the driving shaft 21B interpose the input shaft 25B therebetween along the direction of the first axis N1 of the driving shaft 21B, in particular, the direction substantially parallel to the driving shaft 21B. Supported by the support bracket (see FIGS. 1 to 3) fixed to the trunk lid 2, the relative position of the shaft member 55 to the driving shaft 21B is fixed.

The connection mechanism 30B of the second embodiment includes connection links 60 which are provided with a first connection point P1, a second connection point P2, and a third connection point P3 relatively rotatably connected to the connection portion 33B of the connecting member 34B, the nut member 32B, and the shaft member 55, respectively.

In particular, the connection mechanism 30B of the second embodiment includes the pair of connection links 60 that interposes the nut member 32B therebetween in the axial direction of the driving shaft 21B. The connection links 60 are provided with a first rotation axis Q1, a second rotation axis Q2, and a third rotation axis Q3 which are provided at the first connection point P1 for the connection portion 33B of the connection member 34B, the second connection point P2 for the nut member 32B, and the third connection point P3 for the shaft member 55, respectively, along the first axis N1 of the driving shaft 21B. According to the connection mechanism 30B of the second embodiment, the nut member 32B and the connection portion 33B of the connection member 34B are connected with one another via the connection link 60 to effectively transmit the driving torque that is inputted to the input shaft 25B to the driving shaft 21B.

Further in detail, the connection link 60 of the second embodiment includes an exterior appearance of a long, substantially-flat plate. At a first end of the connection link 60 in the longitudinal direction (at a first end portion 60a), a circle hole 63 penetrating in a thickness direction of the connection link 60 is formed (see FIGS. 9 and 10). In a state where the shaft member 55 is inserted into the circle hole 63, the third connection point P3 is provided for the shaft member 55. In those circumstances, the shaft member 55 (a fourth axis N4) serves as the third rotation axis Q3.

At a second end of the connection link 60 in the longitudinal direction (at a second end portion 60b), a slit 64 extending in the longitudinal direction and opening at an end surface of the second end portion 60b and penetrating the thickness direction of the connection link 60 is formed. In a state where the slit 64 engages with the shaft-shaped portion 34d of the connection member 34B, the first connection point P1 is provided for the connection portion 33B of the connection member 34B configured by the shaft-shaped portion 34d. In those circumstances, the shaft-shaped portion 34d (the third axis N3) serves as the first rotation axis Q1.

That is, according to the connection mechanism 30B of the second embodiment, a first inner wall surface 64a and a second inner wall surface 64b positioned in a direction of the second axis N2 of the input shaft 25B serve as a first wall portion and a second wall portion. The shaft-shaped portion 34d configuring the connection portion 33B of the connection member 34B is interposed by the first inner wall surface 64a and the second inner wall surface 64b and engages with the slit 64. According to the second embodiment, the relative displacement of the connection portion 33B to the input shaft 25B in the direction of the second axis N2 of the input shaft 25B may be restricted while allowing the relative displacement of the connection portion 33B to the nut member 32B in the radial direction thereof.

In addition, at an intermediate portion in the longitudinal direction of the connection link 60, a long hole 65 (serving as an engagement recessed portion) is formed. The long hole 65 penetrates the connection link 60 in the thickness direction, and serves as an engagement recessed portion extending in the longitudinal direction, in particular, the direction connecting the first connection point P1 for the connection portion 33B and the third connection point P3 for the shaft member 55 as the fixed portion. According to the second embodiment, the nut member 32B includes a pair of engagement protrusions 67 which is positioned at two coaxial positions interposing the nut member 32B therebetween and extends along the direction of the first axis N1 of the driving shaft 21B, in particular, the direction substantially parallel to the driving shaft 21B. Specifically, the engagement protrusions 67 are placed at positions where a fifth axis N5 of the engagement protrusions 67 intersects with the second axis N2 of the input shaft 25B so as to be substantially orthogonal to the second axis N2. According to the second embodiment, in a state where the engagement protrusion 67 engages with the long hole 65 of the connection link 60, the second connection point P2 is provided for the nut member 32B. In those circumstances, the engagement protrusion 67 serves as the second rotation axis Q2.

Figure 9:
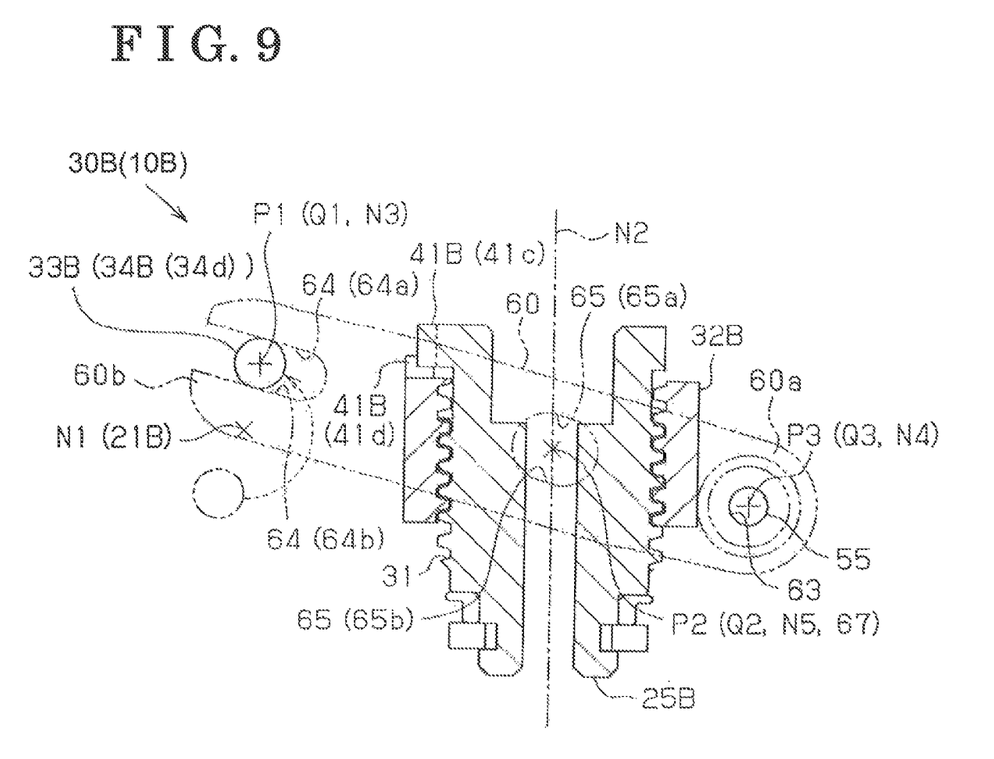
FIG. 9 is a cross-sectional view of the connecting mechanism when the nut member is positioned at the upper portion of the input shaft according to the second embodiment.
Figure 10:
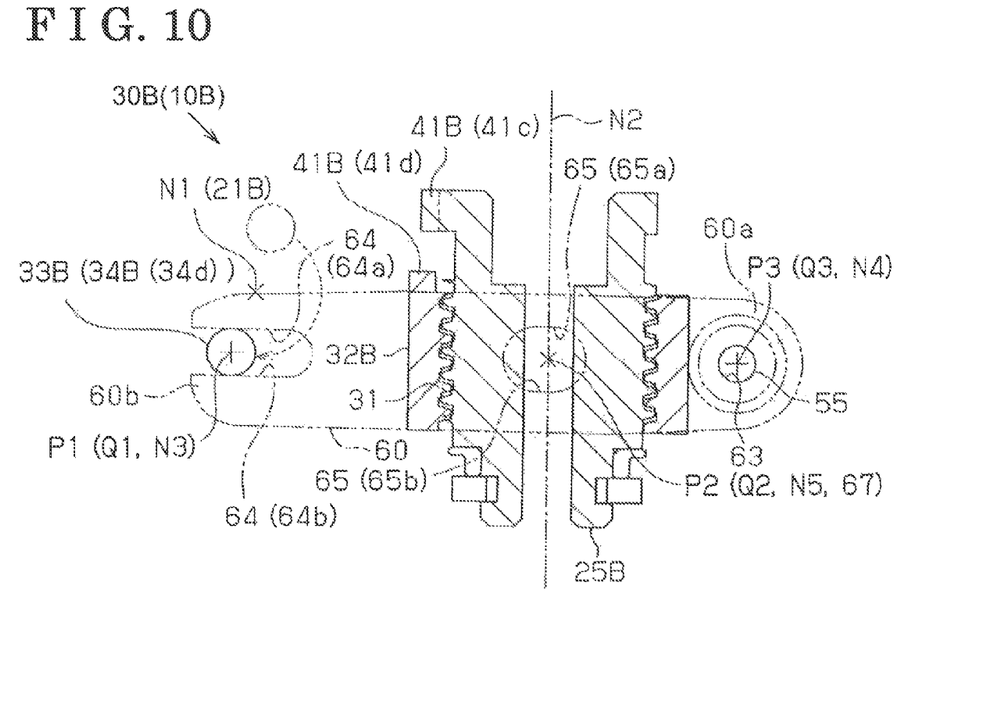
FIG. 10 is a cross-sectional view of the connecting mechanism when the nut member is positioned at the lower portion of the input shaft according to the second embodiment.

Next, the operation of the connection mechanism 30B configured as above will be explained. As shown in FIGS. 9 and 10, according to the connection mechanism 30B of the second embodiment, by moving the nut member 32B in the axial direction in response to the rotation of the input shaft 25B, the engagement protrusion 67 mounted to the nut member 32B pushes the engaged connection link 60 in the direction of the second axis N2 of the input shaft 25B. In particular, the engagement protrusion 67 relatively displaces within the long hole 65 serving as an engagement recessed portion in the longitudinal direction and pushes one of a first inner wall surface 65a and a second inner wall surface 65b which are positioned in the direction of the second axis N2 of the input shaft 25B. Further, the connection link 60 rotates about the third connection point P3 which is positioned at the first end portion 60a for the shaft member 55. In those circumstances, at the first connection point P1 which is positioned at the second end portion 60b of the connection link 60 for the connection portion 33B of the connection member 34B, the connection portion 33B which engages with the slit 64 configuring the first connection point P1 moves along the direction of the second axis N2 of the input shaft 25B. According to the connection mechanism 30B of the second embodiment, by moving the connection portion 33B in the circumferential direction about the first axis N1 of the driving shaft 21B, the connection member 34B integrally rotates with the driving shaft 21B.

According to the connection mechanism 30B of the second embodiment, the input shaft 25B and the nut member 32B include a third protrusion 41c and a fourth protrusion 41d, respectively. The fourth protrusion 41d comes in contact with the third protrusion 41c by moving the nut member 32B in the axial direction in response to the rotation of the input shaft 25B. Serving as stopper portions 41B, the third protrusion 41c and the fourth protrusion 41d restrict the input shaft 25B and the nut member 32B from relatively rotating with each other.

According to the second embodiment, the following effects and advantages are obtained. The connection mechanism 30B includes the connection link 60 which are provided with the first connection point P1, the second connection point P2, and the third connection point P3 relatively rotatably connected to each of the connection portion 33B of the connecting member 34B, the nut member 32B, and the shaft member 55 serving as the fixed portion which does not change the relative position to the driving shaft 21B.

According to the aforementioned configuration, the connection portion 33B of the connection member 34B moves in the circumferential direction about the first axis N1 of the driving shaft 21B smoothly in response to the movement of the nut member 32B in the axial direction. Accordingly, the rotation force that rotates the driving shaft 21B about the first axis N1 may be applied to the connection member 34B efficiently. As a result, the driving torque inputted to the input shaft 25B may be transmitted to the driving shaft 21B efficiently.

The second connection point P2 for the nut member 32B is placed at the position where the second rotation axis Q2 of the second connection point P2 intersects with the second axis N2 of the input shaft 25B. According to the aforementioned configuration, the nut member 32B is prevented from inclining, or tilting in response to the load applied to the second connection point P2. As a result, the driving torque that is inputted to the input shaft 25B may be transmitted to the driving shaft 21B efficiently.

The connection mechanism 30B includes the pair of connection links 60 which interposes the nut member 32B therebetween in the direction of the first axis N1 of the driving shaft 21B. According to the aforementioned configuration, the connection links 60 balance the load applied to the nut member 32B. By preventing the nut member 32B from inclining, the driving torque that is inputted to the input shaft 25B may be transmitted to the driving shaft 21B efficiently.

The shaft member 55 serving as the fixed portion is placed at the position where the shaft member 55 and the driving shaft 21B interpose the input shaft 25B therebetween. Thus, the connection mechanism 30B may be downsized. In addition, the driving torque that is inputted to the input shaft 25B may be transmitted to the driving shaft 21B efficiently.

The connection link 60 includes the long hole 65 which serves as the engagement recessed portion extending in the direction to connect the first connection point P1 for the connection portion 33B of the connection member 34B and the third connection point P3 for the shaft member 55 as the fixed portion. The nut member 32B includes the pair of engagement protrusions 67 which is positioned at two coaxial positions interposing the nut member 32B therebetween and extends along the direction of the first axis N1 of the driving shaft 21B, in particular, the direction substantially parallel to the driving shaft 21B. In a state where the engagement protrusion 67 engages with the long hole 65 of the connection link 60, the second connection point P2 is provided for the nut member 32B. In those circumstances, the engagement protrusion 67 serves as the second rotation axis Q2.

According to the aforementioned configuration, each of the connection links 60 may efficiently rotate about the shaft member 55 serving as the third rotation axis Q3 in response to the movement of the nut member 32B in the axial direction. Thus, the driving torque that is inputted to the input shaft 25B may be transmitted to the driving shaft 21B efficiently.

The connection link 60 extends in the longitudinal direction and includes the slit 64 which opens at the end surface of the second end portion 60b. In a state where the shaft-shaped portion 34d of the connection member 34B engages with the slit 64, the first connection point P1 is provided for the connection portion 33B of the connection member 34B.

According to the aforementioned configuration, the connection portion 33B of the connection member 34B moves in the circumferential direction about the first axis N1 of the driving shaft 21B smoothly in response to the movement of the nut member 32B in the axial direction with the simple configuration.

The aforementioned first and second embodiments may be changed, or modified as follows. According to the first and second embodiments, the spoiler device 10, 10B corresponds to a spoiler device for a known rear spoiler which supports the spoiler 3 above the trunk lid 2 at the rear of the vehicle. Alternatively, the mounting position of the spoiler 3 may be changed desirably. For example, the spoiler 3 may be supported on a roof panel of the vehicle. Alternatively, the spoiler 3 may be a known front spoiler which is supported on the front of the vehicle, for example, on a bumper grille.

According to the first and second embodiments, the spoiler 3 moves down to be housed within the housing recessed portion 20. Alternatively, as long as the spoiler device 10, 10B can change the deployment, or the extension and retraction of the spoiler 3 which protrudes from the vehicle surface S, (the upper surface 3s of) the spoiler 3 comes to be unnecessarily flush with the vehicle surface S. Alternatively, the spoiler 3 may protrude, or may be lifted from the vehicle surface S while maintaining the inclined angle θ. Further, the protrusion amount h may be changed by changing the inclined angle θ while maintaining the position of the front end portion 3a. In a case where the aforementioned configuration is adopted, the spoiler 3 may come to be substantially flush with the vehicle surface S by positioning the front end portion 3a at the vehicle surface S.

According to the aforementioned first and second embodiments, the right-left pair of the link mechanisms 12 supports the spoiler 3 at the positions spaced apart from each other in the vehicle width direction. Alternatively, for example, three or more of the link mechanisms 12 may be provided as long as the link members 11 spaced apart from each other in the vehicle width direction may be connected by the driving shaft 21, 21B.

According to the first and second embodiments, the first axial end portion 21a of the driving shaft 21, 21B is relatively unrotatably fixed to the front link 15 of the link mechanism 12 at the position where the first axial portion 21a is coaxial with the first connection point X1 for the lower bracket 13. Accordingly, the driving shaft 21, 213 is configured to be integrally rotatable with the front link 15 about the first axis N1 which passes through the first connection point X1 for the lower bracket 13. Alternatively, the driving shaft 21, 21B may integrally rotate with the rear link 16 about the second connection point X2 of the rear link 16. Further, the configuration of the link mechanism 12, for example, the number and the shape of the link member 11 may be changed desirably.

According to the first embodiment, the connection portion 33 of the connection member 34 is configured with the shaft-shaped portion 34d which extends along the direction of the driving shaft 21. The engagement portion 38 of the nut member 32 includes the first and second wall portions 38a, 38b which are positioned to interpose the shaft-shaped portion 34d therebetween in the direction of the second axis N2 of the input shaft 25.

Alternatively, the configurations of the connection portion 33 of the connection member 34 and of the engagement portion 38 of the nut member 32 may be changed. For example, the engagement portion 38 of the nut member 32 may include a shaft-shaped portion, whereas the connection portion 33 of the connecting member 34 includes first and second wall portions which interpose the shaft-shaped portion therebetween in the direction of the second axis N2 of the input shaft 25. Alternatively, the engagement portion 38 may be configured in a state where a relative displacement of the connection portion 33 to the input shaft 25 in the direction of the second axis N2 is preventable while allowing the relative displacement of the connection portion 33 to the nut member 32 in the radial direction.

According to the aforementioned second embodiment, the connection link 60 extends in the longitudinal direction and includes the slit 64 which opens at the end surface of the second end portion 60b. In a state where the shaft-shaped portion 34d of the connection member 34B engages with the slit 64, the first connection point P1 is provided for the connection portion 33B of the connection member 34B.

Alternatively, the engagement portion of the connection portion 33B and the connection link 60 which includes the first connection point P1 may be desirably configured. For example, the slit 64 may be a long hole. Alternatively, the slit 64 may be formed with a shape other than a hole as long as first and second wall portions are provided to interpose the shaft-shaped portion 34d of the connection member 34B therebetween in the direction of the second axis N2 of the input shaft 25B. Alternatively, the connection link 60 may include a shaft-shaped portion, whereas the connection portion 33B of the connection member 34B may include first and second wall portions which interpose the shaft-shaped portion therebetween in the direction of the second axis N2 of the input shaft 25B.

According to the second embodiment, the long hole 65 serving as the engagement recessed portion formed at the connection link 60 and the engagement protrusion 67 of the nut member 32B engage with one another to form the second connection point P2 for the nut member 32B. Alternatively, an engagement protrusion may be formed at the connection link 60, whereas an engagement recessed portion may be formed at the nut member 32B.

According to the second embodiment, the shaft member 55 serving as the fixed portion is provided at the position where the shaft member 55 and the driving shaft 21B interpose the input shaft 25B therebetween. Alternatively, the driving shaft 21B, the input shaft 25B and the fixed portion (the shaft member 55) may be positioned desirably. That is, the shaft member 55 serving as the fixed portion may be positioned between the driving shaft 21B and the input shaft 25B. Alternatively, the input shaft 25B and the shaft member 55 may interpose the driving shaft 21B therebetween.

The fixed portion may be desirably formed and configured. According to the aforementioned second embodiment, the connection mechanism 30B includes the pair of connection links 60 which interposes the nut member 32B therebetween in the direction of the first axis N1 of the driving shaft 21B. Alternatively, the connection link 60 may be one.

The second connection point P2 for the nut member 32B is set at the position where the second rotation axis Q2 provided at the second connection point P2 and the second axis N2 of the input shaft 25B intersect with each other. Alternatively, the second connection point P2 does not have to be placed at the position where the second rotation axis Q2 provided at the second connection point P2 and the second axis N2 of the input shaft 25B intersect with each other.

According to the aforementioned first and second embodiments, the input shaft 25, 25B and the nut member 32, 32B include the stopper portions 41, 41B, respectively, that restrict a relative rotation of the input shaft 25, 25B to the nut member 32, 32B by moving the out member 32, 32B in the axial direction of the second axis N2 and come in contact with each other. Alternatively, the construction of the spoiler device 10, 10B does not have to include the stopper portions 41, 41B.

Figure 11:
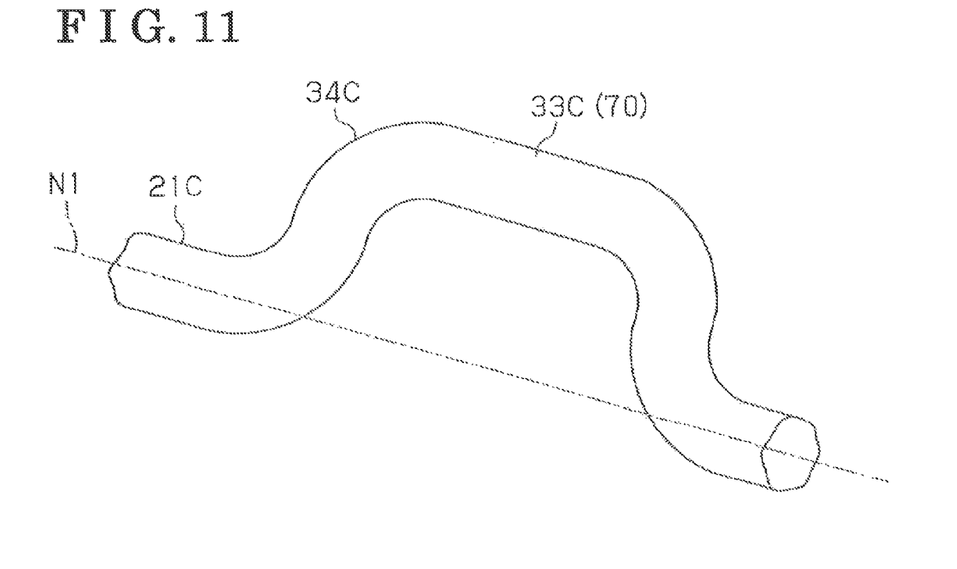
FIG. 11 is a perspective view of a connecting member integrally formed with a driving shaft according to another example of the embodiments.

The screw portion 31 may include any number of threads. According to the aforementioned first and second embodiments, the connection member 34, 34B is formed separately from the driving shaft 21, 21B and is relatively unrotatably fixed to the driving shaft 21, 21B. Alternatively, as shown in FIG. 11, according to another example of the first and second embodiments, a driving shaft 21C may be formed by, for example, the deformation processing and is formed integrally with the connection member 34C. That is, according to this example, the driving shaft 21C is cranked to form a crank portion 70. The connection member 340 may be provided with the crank portion 70 which serves as the connection portion 33C.

Next, the technical idea and the effect that can be grasped in response to the above-described embodiments are described below. According to the spoiler device 10B for the vehicle of this disclosure, the connection portion 33B includes the shaft-shaped portion 34d extending along the driving shaft 21B and engaged with the first and second wall portions 64a, 64b that are placed at positions interposing the shaft-shaped portion in the direction of the second axis N2 of the input shaft 25B. Accordingly, the first connection point P1 for the connection portion 33B may be formed.

The spoiler device 10, 10B for the vehicle of this disclosure includes the connection member 33C that is integrally formed with the driving shaft 21C by the deformation processing of the driving shaft 21C. Accordingly, the construction of the spoiler device 10, 10B for the vehicle may be simplified.

According to the aforementioned embodiments, the spoiler device (10, 10B) for the vehicle includes the plural link mechanisms (12) configured to support the spoiler (3) via the plural rotatable link members (11) in a deployed state where the spoiler (3) protrudes from the surface (S, 2s) of the vehicle (1), the driving shaft (21, 21B, 21C) configured to connect each of the link members (11) provided to be spaced apart from each other in the vehicle width direction, the driving shaft (21, 21B, 21C) configured to change the deployed state and the retracted state of the spoiler (3) by rotating each of the link members (11) about the axis (the first axis N1) of the driving shaft (21, 21B, 21C), and the connection mechanism (30, 30B) connecting the input shaft (25, 25B) to which the driving torque of the power source (22) is inputted and the driving shaft (21, 21B, 21C) to transmit the torque therebetween. The connection mechanism (30, 30B) includes the nut member (32, 32B) being mounted to the screw portion (31) formed on the input shaft (25, 25B), the nut member (32, 32B) thereby moving in the axial direction in response to the rotation of the input shaft (25, 25B), and the connection member (34, 34B, 34C) including the connection portion (33, 33B, 33C) moving in the circumferential direction about the axis (first axis N1) of the driving shaft (21, 21B, 21C) in response to the movement of the nut member (32, 32B) in the axial direction, and the connection member (34, 34B, 34C) integrally rotating with the driving shaft (21, 21B, 21C).

Because the link mechanism 12 can change the deployment, or the extension and retraction of the spoiler 3 in response to the rotation of the link member 11, the housing space required to mount the spoiler device 10, 10B to the vehicle 1 may be reduced. Further, the driving shaft 21, 21B, 21C connects the link members 11 of the link mechanisms 12 which are positioned to be spaced apart from each other in the vehicle width direction, and rotates the link members 11 about the second axis N2 of the driving shaft 21, 21B, 21C. Accordingly, the link mechanisms 12 may synchronously move with each other precisely with the simple configuration. The connection mechanism 30, 30B includes the nut member 32, 32B which is screwed and fixed to the screw portion 31 of the input shaft 25, 25B and the connection member 34, 34B, 34C which includes the connection portion 33, 33B, 33C moving in the circumferential direction about the first axis N1 of the driving shaft 21, 21B, 21C in response to the movement of the nut member 32, 32B in the axial direction and integrally rotates with the driving shaft 21, 21B, 21C. Accordingly, the driving torque that is inputted to the input shaft 25, 25B may be transmitted to the driving shaft 21, 21B, 21C efficiently with the small and simple configuration.

That is, the nut member 32, 32B moves in the axial direction in response to the threading relation (screw pair) with the input shaft 25, 25B, whereas the connection portion 33, 33B, 33C relative to the nut member 32, 32B moves in the circumferential direction about the first axis N1 of the driving shaft 21, 21B, 21C. Accordingly, the rotation force that rotates the driving shaft 21, 21B, 21C about the first axis N1 of the driving shaft 21, 21B, 21C is applied to the connection member 34, 34B, 34C.

In addition, the input shaft 25, 25B may be positioned to intersect with the driving shaft 21, 21B, 21C (including the skew position relative to the driving shaft 21, 21B, 21C). Accordingly, the motor 22 (power source) may be flexibly positioned. Accordingly, the spoiler device 10, 10B may be downsized. According to the aforementioned configuration, the space efficiency and the operation efficiency may be enhanced.

According to the aforementioned embodiment, the nut member (32) includes the engagement portion (38) engaged with the connection portion (33, 33C) in a state where the relative displacement of the connection portion (33, 33C) to the input shaft (25) in the direction of the axis (the second axis N2) thereof is preventable while allowing the relative displacement of the connection portion (33, 33C) to the nut member (32) in the radial direction thereof.

According to the aforementioned embodiment, the connection portion 33, 33C of the connection member 34 may be moved in the circumferential direction about the first axis N1 of the driving shaft 21, 21C smoothly in response to the movement of the nut member 32 in the axial direction. Accordingly, the rotation torque that rotates the driving shaft 21, 21C about the first axis N1 may be applied to the connection member 34, 34C efficiently. As a result, the driving torque which is inputted to the input shaft 25 may be transmitted to the driving shaft 21, 21C efficiently.

According to the aforementioned embodiment, the connection portion (33, 33C) and the engagement portion (38) are formed by the shaft-shaped portion (34d) extending along the driving shaft (21, 21C), and by the first wall portion (38a)

and the second wall portion (38b) being placed at the positions interposing the shaft-shaped portion (34d) therebetween in the direction of the axis (the second axis N2) of the input shaft (25).

According to the aforementioned embodiment, the connection portion 33, 33C and the engagement portion 38 may be engaged in a state where the relative displacement of the connection portion 33, 33C to the input shaft 25 in the direction of the second axis N2 of the input shaft 25 is preventable while allowing the relative displacement of the connection portion 33, 33C to the nut member 32 in the radial direction with the simple configuration. In addition, the mounting process may be efficiently operated.

According to the aforementioned embodiment, the connection mechanism (30B) is provided with at least one of the connection links (60) including the first connection point (P1), the second connection point (P2), and the third connection point (P3) relatively rotatably connected to the connection portion (33B, 33C) of the connection member (34B, 34C), the nut member (32B), and a fixed portion (55) which does not change the relative position to the driving shaft (21B, 21C), respectively.

According to the aforementioned embodiment, the connection portion 33B, 33C of the connection member 34B, 34C may be moved in the circumferential direction about the first axis N1 of the driving shaft 21B, 21C smoothly in response to the movement of the nut member 32B in the axial direction. Accordingly, the rotation force that rotates the driving shaft 21B, 21C about the first axis N1 may be applied to the connection member 34B, 34C efficiently. As a result, the driving torque that is inputted to the input shaft 25B may be transmitted to the driving shaft 21B, 21C efficiently.

According to the aforementioned embodiment, the second connection point (P2) for the nut member (32B) is set at the position where the axis (the fifth axis N5) being formed at the second connection point (P2) and the axis (the second axis N2) of the input shaft (25B) intersect with each other.

According to the aforementioned embodiment, the nut member 32B is prevented from inclining, or tilting in response to the load applied to the second connection point P2. As a result, the driving torque that is inputted to the input shaft 25B may be transmitted to the driving shaft 21B, 21C efficiently.

According to the aforementioned embodiment, the connection mechanism (30B) includes the pair of the connection links (60) interposing the nut member (32B) therebetween in the direction of the axis (the first axis N1) of the driving shaft (21B, 21C).

According to the aforementioned embodiment, the connection links 60 balance the load which is applied to the nut member 32B. By preventing the nut member 32B from inclining, the driving torque that is inputted to the input shaft 25B may be transmitted to the driving shaft 21B, 21C efficiently.

According to the aforementioned embodiment, the input shaft (25B) is positioned between the driving shaft (21B, 21C) and the fixed portion (the shaft member 55).

According to the aforementioned embodiment, the connection mechanism 30B may be downsized. The driving torque that is inputted to the input shaft 25B may be transmitted to the driving shaft 21B, 21C efficiently.

According to the aforementioned embodiment, the connection link (60) includes the engagement recessed portion (65) extending in the direction connecting the first connection point (P1) for the connection portion (33B) and the third connection point (P3) for the fixed portion (55), and the nut member (32B) includes the engagement protrusion (67) engaged with the engagement recessed portion (65).

According to the aforementioned embodiment, the connection link 60 may be rotated about the third connection point P3 which serves as a rotation support point for the fixed portion efficiently in response to the movement of the nut member 32B in the axial direction. As a result, the driving torque that is inputted to the input shaft 25B may be transmitted to the driving shaft 21B, 21C efficiently.

According to the aforementioned embodiment, each of the input shaft (25, 25B) and the nut member (32, 32B) includes the stopper portion (41, 41B) coming in contact with each other by moving the nut member (32, 32B) in the axial direction, the stopper portion (41, 41B) restricting the relative rotation of the input shaft (25, 25B) to the nut member (32, 32B).

According to the aforementioned configuration, the excessive rotation of the input shaft 25, 25B in response to the driving torque of the power source is prevented, whereas the excessive movement of the link mechanisms 12 to which the rotation force is transmitted is prevented. Thus, because the load is reduced, the reliability is enhanced.

According to the aforementioned embodiment, the connection portion (33B, 33C) includes the shaft-shaped portion (34d) extending along the driving shaft (21B, 21C) and engaged with the first wall portion (64a) and the second wall portion (64b) that are placed at the positions interposing the shaft-shaped portion (34d) in the direction of the axis (the second axis N2) of the input shaft (25B), thereby forming the first connection point (P1) for the connection portion (33B, 33C).

According to the aforementioned configuration, the space efficiency and the operation efficiency may be enhanced.

According to the aforementioned embodiment, the spoiler device (10, 10B) for the vehicle further includes the connection member (34C) integrally formed with the driving shaft (21C) by the deformation processing of the driving shaft (21C).

According to the aforementioned configuration, the spoiler device of the embodiments may be constructed with the simple configuration.

According to the aforementioned embodiment, the spoiler device (10, 10B) for the vehicle for changing the deployed state of the spoiler (3), the deployed state where the spoiler (3) protrudes from the surface (S, 2s) of the vehicle (1) includes the plural link mechanisms (12) mounted to the spoiler (3) via the plural rotatable link members (11), the driving shaft (21, 21B, 21C) connecting each of the link members (11) provided to be spaced apart from each other in the vehicle width direction, the driving shaft (21, 21B, 21C) rotating each of the link members (11) about the axis (the first axis N1) of the driving shaft (21, 21B, 21C), and the connection mechanism (30, 30B) connecting the input shaft (25, 25B) to which the driving torque of the power source (22) is inputted and the driving shaft (21, 21B, 21C) to transmit the torque therebetween. The connection mechanism (30, 30B) includes the nut member (32, 32B) being mounted to the screw portion (31) formed on the input shaft (25, 25B), the nut member (32, 32B) thereby moving in the axial direction in response to the rotation of the input shaft (25, 25B), and the connection member (34, 34B, 34C) including the connection portion (33, 33B, 33C) moving in the circumferential direction about the axis (the first axis N1) of the driving shaft (21, 21B, 21C) in response to the movement of the nut member (32, 32B) in the axial direction, the connection member (34, 34B, 34C) integrally rotating with the driving shaft (21, 21B, 21C).

According to the aforementioned configuration, the space efficiency and the operation efficiency may be enhanced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spoiler device for a vehicle, comprising:
a plurality of link mechanisms configured to support a spoiler via a plurality of rotatable link members in a deployed state where the spoiler protrudes from a surface of the vehicle;
a driving shaft configured to connect each of the link members provided to be spaced apart from each other in a vehicle width direction, the driving shaft configured to change the deployed state and a retracted state of the spoiler by rotating each of the link members about an axis of the driving shaft; and
a connection mechanism connecting an input shaft to which a driving torque of a power source is inputted and the driving shaft to transmit the torque therebetween: wherein
the connection mechanism includes:
a nut member being mounted to a screw portion formed on the input shaft, the nut member thereby moving in an axial direction in response to a rotation of the input shaft; and
a connection member including a connection portion moving in a circumferential direction about the axis of the driving shaft in response to a movement of the nut member in the axial direction, the connection member integrally rotating with the driving shaft.

2. The spoiler device for the vehicle according to claim 1, wherein the nut member includes an engagement portion engaged with the connection portion in a state where a relative displacement of the connection portion to the input shaft in a direction of an axis thereof is preventable while allowing a relative displacement of the connection portion to the nut member in a radial direction thereof.

3. The spoiler device for the vehicle according to claim 2, wherein the connection portion and the engagement portion are formed by a shaft-shaped portion extending along the driving shaft, and by a first wall portion and a second wall portion being placed at positions interposing the shaft-shaped portion therebetween in the direction of the axis of the input shaft.

4. The spoiler device for the vehicle according to claim 1, wherein the connection mechanism is provided with at least one connection link including a first connection point, a second connection point, and a third connection point relatively rotatably connected to the connection portion of the connection member, the nut member, and a fixed portion which does not change a relative position to the driving shaft, respectively.

5. The spoiler device for the vehicle according to claim 4, wherein the second connection point for the nut member is set at a position where an axis being formed at the second connection point and an axis of the input shaft intersect with each other.

6. The spoiler device for the vehicle according to claim 4, wherein the connection mechanism includes a pair of the connection links interposing the nut member therebetween in a direction of the axis of the driving shaft.

7. The spoiler device for the vehicle according to claim 4, wherein the input shaft is positioned between the driving shaft and the fixed portion.

8. The spoiler device for the vehicle according to claim 4, wherein:
the connection link includes an engagement recessed portion extending in a direction connecting the first connection point for the connection portion and the third connection point for the fixed portion; and
the nut member includes an engagement protrusion engaged with the engagement recessed portion.

9. The spoiler device for the vehicle according to claim 1, wherein each of the input shaft and the nut member includes a stopper portion coming in contact with each other by moving the nut member in the axial direction, the stopper portion restricting a relative rotation of the input shaft to the nut member.

10. The spoiler device for the vehicle according to claim 1, wherein the connection portion includes a shaft-shaped portion extending along the driving shaft and engaged with a first wall portion and a second wall portion that are placed at positions interposing the shaft-shaped portion in a direction of an axis of the input shaft, thereby forming a first connection point for the connection portion.

11. The spoiler device for the vehicle according to claim 1, further comprising:
the connection member integrally formed with the driving shaft by a deformation processing of the driving shaft.

12. A spoiler device for a vehicle for changing a deployed state of a spoiler, the deployed state where the spoiler protrudes from a surface of the vehicle, comprising:
a plurality of link mechanisms attached to the spoiler via a plurality of rotatable link members;
a driving shaft connecting each of the link members provided to be spaced apart from each other in a vehicle width direction, the driving shaft rotating each of the link members about an axis of the driving shaft; and
a connection mechanism connecting an input shaft to which a driving torque of a power source is inputted and the driving shaft to transmit the torque therebetween: wherein
the connection mechanism includes:
a nut member being mounted to a screw portion formed on the input shaft, the nut member thereby moving in an axial direction in response to a rotation of the input shaft; and
a connection member including a connection portion moving in a circumferential direction about the axis of the driving shaft in response to a movement of the nut member in the axial direction, the connection member integrally rotating with the driving shaft.

* * * * *